(12) United States Patent
Cho

(10) Patent No.: US 8,619,536 B2
(45) Date of Patent: Dec. 31, 2013

(54) DEVICE AND METHOD FOR CONTROLLING AN OPTICAL SOURCE DRIVER

(71) Applicant: Toshiba Samsung Storage Technology Korea Corporation, Suwon-si (KR)

(72) Inventor: Kang-soo Cho, Suwon-si (KR)

(73) Assignee: Toshiba Samsung Storage Technology Korea Corporation, Suwon-si (KR)

( * ) Notice: Subject to any disclaimer, the term of this patent is extended or adjusted under 35 U.S.C. 154(b) by 0 days.

(21) Appl. No.: 13/741,484

(22) Filed: Jan. 15, 2013

(65) Prior Publication Data

US 2013/0182548 A1    Jul. 18, 2013

(30) Foreign Application Priority Data

Jan. 16, 2012 (KR) .................. 10-2012-0004908

(51) Int. Cl.
*G11B 7/00* (2006.01)
(52) U.S. Cl.
USPC ....................................... 369/116
(58) Field of Classification Search
USPC ........... 369/120, 121, 122, 47.51, 47.53, 116, 369/13.26
See application file for complete search history.

(56) References Cited

U.S. PATENT DOCUMENTS

| | | | |
|---|---|---|---|
| 7,266,073 B2 * | 9/2007 | Ishibashi et al. | 369/120 |
| 7,573,797 B2 | 8/2009 | Asada et al. | |
| 7,751,302 B2 | 7/2010 | Nam et al. | |
| 7,869,333 B2 * | 1/2011 | Shiozawa et al. | 369/116 |
| 8,264,917 B2 * | 9/2012 | Nakano et al. | 369/13.26 |
| 8,325,583 B2 * | 12/2012 | Dean et al. | 369/116 |
| 2002/0021641 A1 * | 2/2002 | Miyabata et al. | 369/53.26 |
| 2010/0214899 A1 | 8/2010 | Hsu et al. | |
| 2010/0315937 A1 | 12/2010 | Doi et al. | |

FOREIGN PATENT DOCUMENTS

JP    2004-055105    2/2004

OTHER PUBLICATIONS

Korean Office Action issued on Dec. 12, 2012 in counterpart Korean Patent Application No. 10-2012-0004908 (4 pages, in Korean).

* cited by examiner

*Primary Examiner* — Nabil Hindi
(74) *Attorney, Agent, or Firm* — NSIP Law

(57) ABSTRACT

A device and method for controlling a driving current with respect to an optical source of an optical disc drive are provided. The method includes changing a characteristic of a high frequency component based on a change in the peripheral temperature of on optical pickup device, modulating the driving current using the high frequency component, and applying the modulated driving current to the optical source.

17 Claims, 3 Drawing Sheets

DEVICE AND METHOD FOR CONTROLLING AN OPTICAL SOURCE DRIVER

CROSS-REFERENCE TO RELATED APPLICATION(S)

This application claims the benefit under 35 USC §119(a) of Korean Patent Application No. 10-2012-0004908, filed on Jan. 16, 2012, in the Korean Intellectual Property Office, the entire disclosure of which is incorporated herein by reference for all purposes.

BACKGROUND

1. Field

The following description relates to a device and method for controlling an optical source driver, and more particularly to, a device and method for controlling an optical disc drive configured to control feedback noise.

2. Description of Related Art

In recording or reproducing information to or from an optical disc, high frequency modulation (HFM) may be applied to prevent a jitter characteristic from deteriorating and to prevent an optical output from changing due to feedback noise. In this case, the HFM reduces the feedback noise and thus prevents distortion of a recording waveform and prevents the degradation the quality of reproduction information.

In general, the HFM of an optical disc drive has a fixed size and frequency. A general characteristic of the optical disc drive is determined at room temperature. When a characteristic of the optical disc drive changes due to an increased or decreased temperature in comparison to a room temperature, it may be difficult to record and reproduce optimal information in reliance on a previously set parameter.

SUMMARY

In an aspect, there is provided a method of controlling an optical output, the method including generating a driving current for an optical source of an optical pickup device, changing a characteristic of a high frequency component based on a change of a peripheral temperature of the optical pickup device, modulating the driving current using the changed high frequency component, and applying the modulated driving current to the optical source.

The driving current may comprise a reading current used to read information from an optical disc.

The characteristic of the high frequency component that is changed may be an amplitude.

The amplitude may be increased in response to an increase in the peripheral temperature.

The amplitude may be decreased in response to a decrease in the peripheral temperature.

The characteristic of the high frequency component may be non-linearly changed according to a change of the peripheral temperature.

The characteristic of the high frequency component may be changed in response to the peripheral temperature being changed from a predetermined room temperature.

In an aspect, there is provided an optical disc drive including an optical pickup device comprising an optical source, a temperature sensor configured to sense a temperature signal from the optical pickup device, a temperature detection unit configured to detect a peripheral temperature of the optical disc drive using the temperature signal sensed by the temperature sensor, an optical source driver configured to generate a driving current applied to the optical source, and a high frequency modulation (HFM) circuit configured to supply a HFM component used to modulate the driving current to the optical source driver, the HFM component comprising a characteristic that is changed based on a change in the peripheral temperature detected by the temperature detection unit.

The modulated driving current may comprise a reading current used to read information from an optical disc.

The characteristic of the HFM component that is changed may be an amplitude.

The amplitude may be increased in response to an increase in the peripheral temperature.

The amplitude may be decreased in response to a decrease in the peripheral temperature.

The HFM circuit may non-linearly change the characteristic of the high frequency component according to a change of the temperature.

The HFM circuit may adjust the characteristic of the high frequency component in response to the peripheral temperature being adjusted from a predetermined room temperature.

In an aspect, there is provided a method of modulating a driving current for an optical source of an optical pickup device, the method including detecting a change in the peripheral temperature of the optical pickup device, and modulating the driving current supplied to the optical source using a high frequency component that has a characteristic that is changed based on the detected change of the peripheral temperature of the optical source.

An amplitude of the high frequency component may be non-linearly changed based on the detected change of the peripheral temperature.

The amplitude of the high frequency component may be adjusted in response to the peripheral temperature being adjusted from a predetermined room temperature.

Other features and aspects may be apparent from the following detailed description, the drawings, and the claims.

Figure 1:
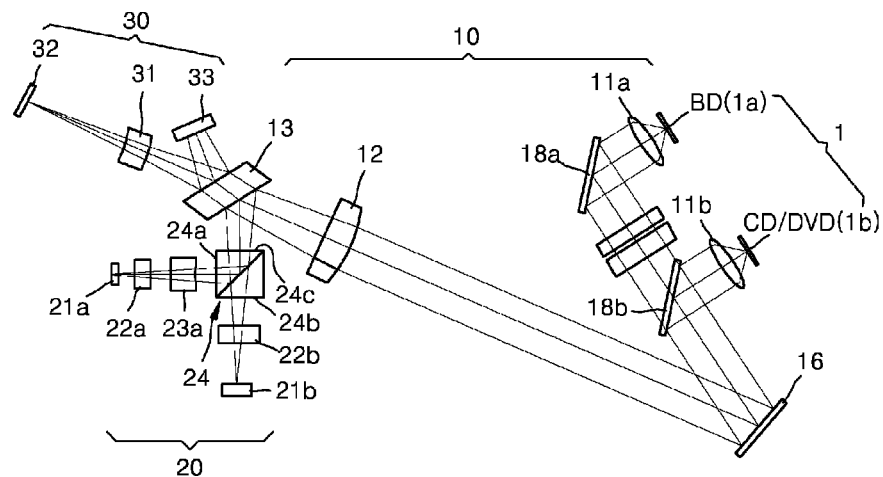
FIG. 1 is a diagram illustrating an example of an optical pickup device applied to an optical disc drive.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

Figure 2:
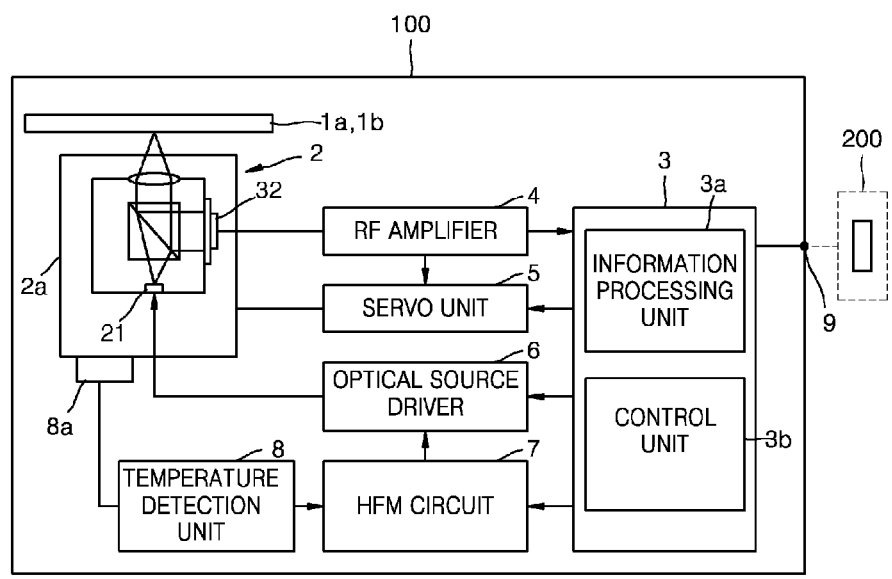
FIG. 2 is a diagram illustrating an example of an optical disc drive.

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descrip- FIG. 1 illustrates an example of an optical pickup device applied to an optical disc drive. FIG. 2 illustrates an example of an optical disc drive 100.

Referring to FIG. 1, the optical pickup device includes an optical transmission system 10 that responds to a medium 1 (1a and 1b), an optical source system 20 that provides a beam for reproducing and/or recording information from and/or to the medium 1, and an optical receiving system 30 that receives the beam reflected from the medium 1.

The optical source system 20 may include a first optical source 21a for a Blu-ray disc (BD) 1a, a first diffraction device 22a for the BD 1a, a coupling lens 23a, a second optical source 21b for a compact disc/digital versatile disc (CD/DVD) 1b, a second diffraction device 22b for the CD/DVD 1b, and a first beam splitter 24. The first beam splitter 24 may have a cubic structure in which a beam from the first optical source 21 a and a beam from the second optical source 21 b are directed incident into a first surface 24a and a second surface 24b that are adjacent to each other. Light from the first and second optical sources 21a and 21b is commonly output to a third surface 24c that faces the second surface 24b, and the beams therefrom are incident into a second beam splitter 13. The coupling lens 23a may adjust an optical magnification between the first optical source 21a and the first beam splitter 24, i.e. a defocus amount of traveling light, and may adjust an optical distance from the first optical source 21a to the medium 1 (1a and 1b).

The first and second diffraction devices 22a and 22b form a single beam from the first and second optical sources 21a and 21b as a main beam and a primary sub beam according to a diffraction effect. The main beam and the primary sub beam may have a polarized light component in a first direction (hereinafter referred to as first polarized light) and a polarized light component in a second direction (hereinafter referred to as second polarized light). In this example, the second direction may be a different direction from the first direction, i.e., perpendicular to the first direction. The first and second diffraction devices 22a and 22b may change an interval between the main beam and 1st-order sub beam according to a gap between lattices thereof or a cycle.

The optical transmission system 10 includes an optical path refraction mirror 16 that refracts a path of light incident from the second beam splitter 13, a dichroic mirror 18a that is disposed on a reflected light traveling path from the optical path refraction mirror 16, and a total reflection mirror 18b that reflects the beam for the BD 1a transmitted through the dichroic mirror 18a. In this example, the dichroic mirror 18a reflects a beam of a specific wavelength among the incident beam, for example, light for the CD/DVD 1b, and transmits light for the BD 1a. A first objective lens 11a for the BD 1a is disposed on a reflected light traveling path of the total reflection mirror 18b. A second objective lens 11b for the CD/DVD 1b is disposed on a reflected light traveling path of the dichroic mirror 18a.

The optical receiving system 30 includes an optical receiving device 32 and a monitoring optical detection device 33 that directly receives the beam from the optical source system 20. For example, the optical detection device 33 may be a front photo detector (FPD). The optical receiving device 32 of the optical receiving system 30 and the first and second optical sources 21a and 21b of the optical source system 20 may be connected to a radio frequency (RF) amplifier and a laser diode driver (LDD).

Referring to FIG. 2, the optical disc drive 100 includes an optical pickup device 2 that reads and records information from and to the medium 1a or 1b. For example, the optical pickup device 2 may be the optical pickup device of FIG. 1. The optical pickup device 2 may include the above-described optical systems of the optical pickup device and a mechanical system 2a that mechanically supports the optical systems and performs focusing and tracking operations.

The optical receiving device 32 of the optical receiving system 30 is electrically connected to an RF amplifier 4. An optical source 21 is connected to an optical source driver 6 (or an LDD). For example, the optical source driver 6 may be connected to a high frequency modulation (HFM) circuit 7. The mechanical system 2a of the optical pickup device 2 is connected to a servo unit 5. The servo unit 5 may perform tracking and focusing controls of the optical pickup device 2. The RF amplifier 4, the servo unit 5, the optical source driver 6, and the HFM circuit 7 may be connected to a digital signal processor (DSP) controller 3. In this example, the DSP controller 3 includes an information processing unit 3a including an encoder/decoder that processes a signal from the RF amplifier 4 and a system control unit 3b that may control one or more system elements such as the servo unit 5, the optical source driver 6, and/or the HFM circuit 7.

The HFM circuit 7 provides the optical source driver 6 with a HFM component. According to various aspects, the HFM circuit 7 may be connected to a temperature detection unit 8 that may process a signal from a temperature sensor 8a. For example, the temperature sensor 8a may measure a peripheral temperature around the optical pickup device 2 or the optical disc drive 100.

According to various aspects, the HFM circuit 7 may control a swing or amplitude of a high frequency component according to a temperature of the optical pickup device 2. For example, the HFM circuit 7 may change a reference amplitude that is set on the basis of a room temperature, according to a temperature change. For example, the HFM circuit may adjust the amplitude to up to 1.5 times the reference amplitude or more in a high temperature environment, and may adjust the amplitude to as little as 0.5 times or less the reference amplitude in a low temperature environment.

Figure 3:
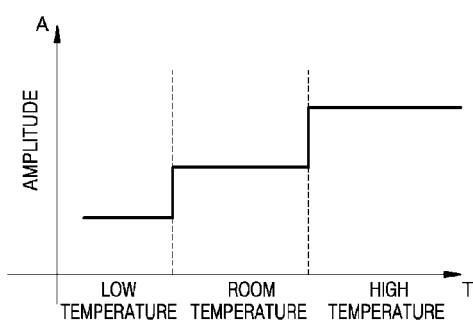
FIG. 3 is a graph illustrating an example of an amplitude change of a high frequency modulation (HFM) component for each temperature band in a method of controlling an optical output.

As an example, the HFM circuit 7 may change the amplitude in a multi step with respect to a predetermined temperature section as described above. In another example, the HFM circuit 7 may change the amplitude linearly with respect to a specific temperature or non-linearly in a predetermined section of a change section. For example, the HFM circuit 7 may change the amplitude within a three or more step range by splitting an entire temperature range in which the optical disc drive 100 can operate into several step ranges, and, for example, as shown in FIG. 3, dividing the several step ranges into a room temperature region, a high temperature region, and a low temperature region. In this example, the high temperature region and the low temperature region are respectively higher and lower than the room temperature region.

Figure 4:
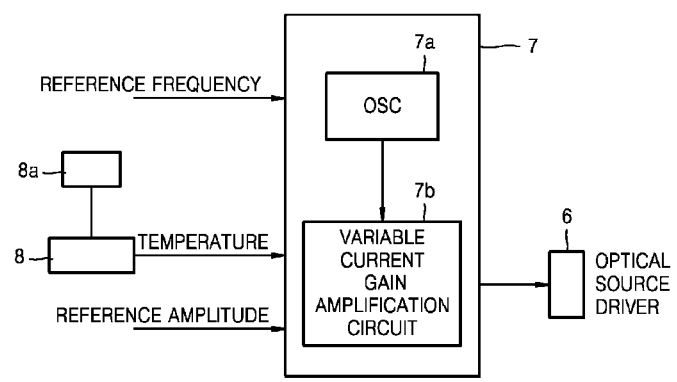
FIG. 4 is a diagram illustrating an example of a HFM circuit applied to an optical disc drive.

FIG. 4 illustrates an example of the HFM circuit 7. Referring to FIG. 4, a current corresponding to a reference frequency and a reference amplitude is applied to the HFM circuit 7. Two digital to analog (DA) converted signals are respectively applied to an oscillation unit 7a and an amplification circuit 7b of the HFM circuit 7. In this example, the oscillation unit 7a may generate a high frequency current corresponding to the input signals, and the amplification circuit 7b may determine an amplitude of the high frequency current.

According to various aspects, in the case of a range of a room temperature that is a reference temperature, the HFM circuit 7 may determine a gain of the high frequency current as the reference amplitude. In the case of a range of a high temperature, the HFM circuit 7 may determine the gain of the high frequency current as greater than the reference amplitude. In the case of a range of a low temperature, the HFM circuit 7 may determine the gain of the high frequency current as less than the reference amplitude. The high frequency current from the HFM circuit 7 may be added to an optical source driving current and output as the light source 21 in the optical source driver 6.

Figure 5:
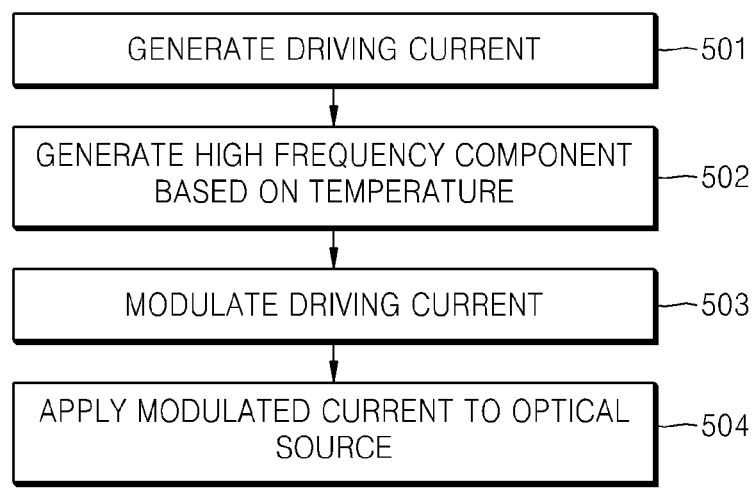
FIG. 5 is a diagram illustrating an example of a method of controlling an optical output of an optical disc drive.

FIG. 5 illustrates an example of a method of controlling an optical output of an optical disc drive.

Referring to FIG. 5, the method includes generating a driving current with respect to an optical source of an optical pickup device, in 501. In 502, a characteristic of a high frequency component is changed based on a change in the peripheral temperature. The driving current is modulated using the high frequency component, in 503. The modulated driving current is applied to an optical source in 504. The examples described herein with respect to FIGS. 1 through 4, are also applicable to the example of the method described with respect to FIG. 5.

According to various aspects, adjusting of a gain of the high frequency current according to a temperature change may be effective to a reading process for obtaining information from an optical disc and may be applied to an optical light recording process. The adjustment of the amplitude of the HFM current according to a temperature change may optimize reading performance of an optical disc drive.

The optical disc drive described herein may be included in various devices, for example, a computer, a game console, a Blu-ray player, a CD/DVD player, a television, an appliance, a terminal, a set-top box, and the like.

Program instructions to perform a method described herein, or one or more operations thereof, may be recorded, stored, or fixed in one or more computer-readable storage media. The program instructions may be implemented by a computer. For example, the computer may cause a processor to execute the program instructions. The media may include, alone or in combination with the program instructions, data files, data structures, and the like. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions, that is, software, may be distributed over network coupled computer systems so that the software is stored and executed in a distributed fashion. For example, the software and data may be stored by one or more computer readable storage mediums. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein. Also, the described unit to perform an operation or a method may be hardware, software, or some combination of hardware and software. For example, the unit may be a software package running on a computer or the computer on which that software is running.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of controlling an optical output, the method comprising:
    generating a driving current for an optical source of an optical pickup device;
    splitting an entire temperature range in which the optical pickup operates into a room temperature region, a high temperature region, and a low temperature region;
    changing a characteristic of a high frequency component based on a change of a peripheral temperature of the optical pickup device into one of the room temperature region, the high temperature region, and the low temperature region;
    modulating the driving current using the changed high frequency component; and
    applying the modulated driving current to the optical source.

2. The method of claim 1, wherein the driving current comprises a reading current used to read information from an optical disc.

3. The method of claim 1, wherein the characteristic of the high frequency component that is changed is an amplitude.

4. The method of claim 3, wherein the amplitude is increased in response to an increase in the peripheral temperature.

5. The method of claim 3, wherein the amplitude is decreased in response to a decrease in the peripheral temperature.

6. The method of claim 1, wherein the characteristic of the high frequency component is non-linearly changed according to a change of the peripheral temperature.

7. The method of claim 1, wherein the characteristic of the high frequency component is changed in response to the peripheral temperature being changed from a predetermined room temperature.

8. An optical disc drive comprising:
    an optical pickup device comprising an optical source;
    a temperature sensor configured to sense a temperature signal from the optical pickup device;
    a temperature detection unit configured to detect a peripheral temperature of the optical disc drive using the temperature signal sensed by the temperature sensor;
    an optical source driver configured to generate a driving current applied to the optical source; and
    a high frequency modulation (HFM) circuit configured to supply a HFM component used to modulate the driving current to the optical source driver, to split an entire temperature range in which the optical pickup operates into a room temperature region, a high temperature region, and a low temperature region, wherein the HFM component comprises a characteristic that is changed based on a change in the peripheral temperature detected by the temperature detection unit into one of the room temperature region, the high temperature region, and the low temperature region.

9. The optical disc drive of claim 8, wherein the modulated driving current comprises a reading current used to read information from an optical disc.

10. The optical disc drive of claim 8, wherein the characteristic of the HFM component that is changed is an amplitude.

11. The optical disc drive of claim 10, wherein the amplitude is increased in response to an increase in the peripheral temperature.

12. The optical disc drive of claim 10, wherein the amplitude is decreased in response to a decrease in the peripheral temperature.

13. The optical disc drive of claim 8, wherein the HFM circuit non-linearly changes the characteristic of the high frequency component according to a change of the temperature.

14. The optical disc drive of claim 8, wherein the HFM circuit adjusts the characteristic of the high frequency component in response to the peripheral temperature being adjusted from a predetermined room temperature.

15. A method of modulating a driving current for an optical source of an optical pickup device, the method comprising:
 splitting an entire temperature range in which the optical pickup operates into a room temperature region, a high temperature region, and a low temperature region;
 detecting a change in the peripheral temperature of the optical pickup device into one of the room temperature region, the high temperature region, and the low temperature region; and
 modulating the driving current supplied to the optical source using a high frequency component that has a characteristic that is changed based on the detected change of the peripheral temperature of the optical source.

16. The method of claim 15, wherein an amplitude of the high frequency component is non-linearly changed based on the detected change of the peripheral temperature.

17. The method of claim 16, wherein the amplitude of the high frequency component is adjusted in response to the peripheral temperature being adjusted from a predetermined room temperature.

* * * * *